Jan. 3, 1956 A. S. THOMSON 2,729,076
MACHINE ATTACHMENTS FOR TOOLS
Filed Sept. 20, 1951
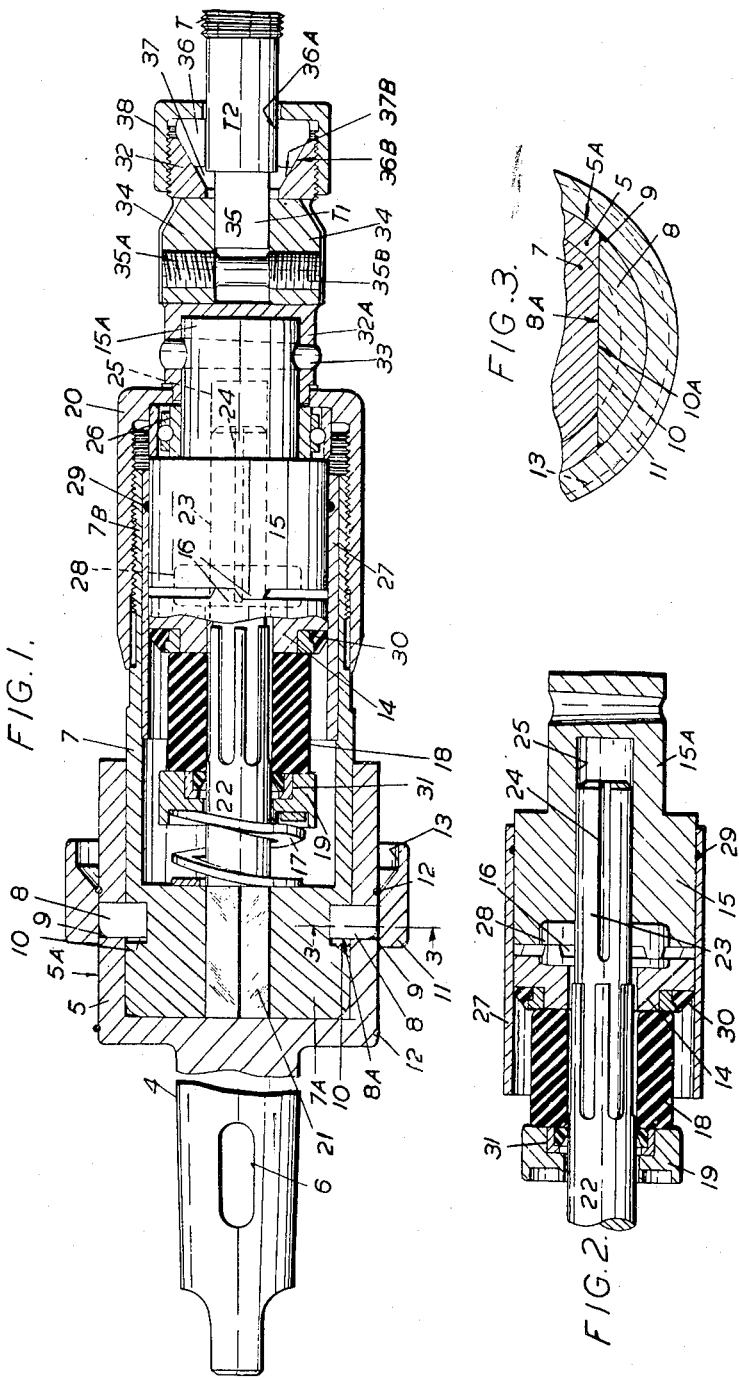
Inventor
Allan Stevenson Thomson
By Mechlin & Mechlin
Attorney United States Patent Office 2,729,076
Patented Jan. 3, 1956

2,729,076

MACHINE ATTACHMENTS FOR TOOLS

Allan Stevenson Thomson, Greenock, Scotland

Application September 20, 1951, Serial No. 247,397

Claims priority, application Great Britain September 28, 1950

4 Claims. (Cl. 64—29)

This invention relates to machine attachments for tools that are fitted to machines for drilling and reamering holes, tapping and dieing screwthreads and milling or other machining operations, the attachments being provided to carry rotationally or stationarily the drills, reamers, taps, dies or other tools by which the operations are performed.

The invention relates in particular to machine attachments as aforesaid and of the type incorporating a safety slipping clutch by virtue of which jamming or obstruction of the tool in the performance of its work leads to slipping of the clutch, so that the tool and other parts are saved from damage or destruction by the continuing drive of the machine.

The invention comprises a machine attachment of the slipping clutch type in which the clutch is contained in a casing and the attachment has an internal self-contained closed lubricating system including an oil reservoir which is provided in the interior of the clutch and which communicates with relatively movable surfaces between the clutch and the casing and also with the inter-engaging elements of the clutch itself.

An example of the invention will now be described with reference to the accompanying drawings in which:—

Fig. 1 is a sectional elevation of a complete attachment for the holding and driving of taps. Fig. 2 is a mid-section of parts already shown in Fig. 1. Fig. 3 is a section on the line 3—3 of Fig. 1.

The attachment shown includes a quick-change holder comprising a combined shank 4 and socket 5. The shank is insertable fully into, and securable at 6 by a cotter pin to, the machine spindle (not shown) in the usual way. The socket 5 has the adaptor 7 inserted in it. The means for securing and transmitting driving torque to the adaptor comprise a pair of diametrally opposed segment-form keys 8, both slidable radially in openings 9 for them in the cylindrical wall of the socket. These keys, in their normal innermost position, as shown in Fig. 1 and 3, come flush with the outer surface 5A of the socket wall and they are seated snugly in segmental grooves 10 formed in the adaptor 7, the flat sides 8A of the keys bearing against the flat bases 10A of the grooves. An axially slidable locking collar 11 on the socket normally, as shown, holds the keys 8 in position against the bases of both the openings 9 and the grooves 10. The limits of the sliding movement of the collar are defined by locking rings fitted in circumferential grooves in the socket surface 5A. The collar is formed internally with a circular enlargement, or mouth 13, which registers with the keys whenever the collar is slid fully away (that is, to the left in Fig. 1) from its normal position, the keys 8 then being free to move radially outwards to positions clear of the adaptor 7. When the keys are so positioned, the adaptor is disengaged and can be slid out of engagement with the socket.

To facilitate tapping (or dieing) a short clearance space is left between one side face 8A of each key and its groove 10. This space provides a limited amount of axial play, by virtue of which the tap (or die) can adjust itself to coincide with a screw-thread already started or partly formed.

In use of the quick-change holder, the operator can remove the adaptor 7 and replace it by another adaptor or by a drill or other tool merely by grasping the collar 11, sliding it back and, when the keys 8 are fully displaced outwards, removing the adaptor; and thereafter he inserts the new adaptor, drill or other tool and slides the collar into its locking position. The keys 8 can easily be displaced outwards by the operator turning the adaptor relative to the socket 5.

Seeing that the quick-change holder, 4, 5 is capable of use as a master holder suitable for a range of adaptors in themselves each a holder of a range of taps or other tools, the total range of tools for which the quick-change holder is suitable is very wide. This total range for which a machine is suitable can be further widened by having a variety of quick-change holders 4, 5 to suit different kinds or sizes of adaptors 7 or tools.

By virtue of the secure grip exerted by the keys 8 in the socket 5 and the grooves 10 of the adaptor (or tool), backlash between the quick-change holder and the adaptor (or tool) is eliminated, there being a serious tendency to such backlash when the safety slipping clutch (hereinafter described) slips in the performance of its safety function.

The adaptor 7 is fitted with the safety slipping clutch, which consists of two mating clutch components 14, 15, both of the same diametral size and both formed with inter-engaging elements 16, these components being yieldingly pressed into interengagement by a compression spring assembly, which in the example consists of a helical metal spring 17, a cylindrical block 18 of rubber or equivalent resilient material, and a slidable ring 19 between the spring 17 and block 18. The inter-engaging clutch elements each consist of spaced camlike humps (see Fig. 1) shaped so that they can transmit the rotary drive in either direction but can slip in the event that rotation of the tap (or other tool) is excessively obstructed.

The adaptor 7 is made as a casing with a heavy end wall 7A and a cylindrical skirt 7B upon which there is screwed a sleevelike nut 20 for adjusting the pressure applied to the slipping clutch by the spring assembly 17, 18, 19. The casing contains the clutch and spring parts 14 to 19.

The adaptor 7 also includes a short central shaft which has, firstly, a square end 21; secondly, an intermediate splined length 22; and thirdly, a cylindrical length 23 with one or more longitudinal oil grooves 24. The square end fits into a complemental hole in the end wall 7A of the adaptor and transmits the drive to the shaft, the splined length fits through and drives the spring block 18 and driving component 14 of the clutch, which component is slidable along the splined length. The cylindrical length is freely turnable and slidable in a blind hole 25 extending into the driven clutch component 15. The driven component ends in a spigot 15A provided as a jointing means for the tap-gripping chuck. A journal thrust bearing consisting of a ball-race 26 is interposed as an abutment between the sleevelike nut 20 and the driven component 15.

Thus, it will be seen that the rotary drive is transmitted from the quick-change holder 4, 5, through the segment-form keys 8, the adaptor casing end wall 7A, the central shaft portions 21, 22 and the spring block 18 and driving and driven clutch components 14, 15 to the spigot jointing means 15A. Moreover, whenever the tap (or other tool) is thrust into the work, the reaction of the work is transmitted from the spigot jointing means 15A through the driven and driving clutch components 15, 14, the compression spring assembly 18, 19, 17 and the end wall 7A to the quick-change holder 5, 4. It will be obvious that these various parts should be so related that they are maintained rigidly in axial alignment throughout the varying thrust conditions and that the parts which by looseness of fit might tend to permit non-rigidity are the adaptor casing and the relatively movable clutch components 14, 15 within it. In the example, any such tendency is minimised by fitting a thin cast iron liner 27 into the adaptor skirt 7B and making the cylindrical surfaces of the clutch components (which are made of steel) a very close working fit in the liner, which provides a continuous cylindrical bearing surface for said components. It is practicable to make such a fit by selecting cast iron as the material of the liner, that kind of cast iron known as "Melonite" being preferred.

Axial compactness and axial rigidity of the attachment are enhanced by the construction and arrangement by virtue of which the parts 17–22 within the hollow interior of the adaptor 7 extend for the full depth of the deep holder socket 5 and the adaptor 7 itself fits neatly into the socket 5 also throughout the full depth thereof. Thus, the quick-change holder 4, 5 with its practical advantages are provided without adding seriously to the length of the attachment and without detracting from its rigidity.

Wear between the relatively movable parts inside the adaptor casing is minimised by providing a self-contained internal lubricating system. This system includes an annular chamber 28 which forms an oil reservoir. The chamber is formed in both components 14, 15 of the clutch, the chamber surrounding the central shaft portion 23 and leading to and past the inter-engaging clutch elements 16. Oil from the chamber seeps between the inter-engaging clutch elements 16 and flows through a passage left between the components 14, 15 to the relatively movable surfaces of the components 14, 15 and the liner 27 in order to lubricate these surfaces and said elements. The one or more longitudinal oil grooves 24 in the central shaft extend as an oil passage between the reservoir and the end of the hole 25 in the driven clutch component. In order that the oil system will be confined, appropriate seals are provided. One of these seals is a ring 29 fitted in the liner 27 and encircling the driven clutch component. A second of these seals is a ring 30 of rubber bonded on metal which is fitted on the driving clutch component 14. A third of these seals is a washer 31 also of rubber bonded on metal, which is a close sliding fit on the splined length 22 of the central shaft and which is sandwiched between the spring block 18 and the ring 19 between it and the compression spring 17. The two sealing rings 29, 30 bear against the internal surface of the liner 27 and serve as the external boundaries of the oil system. The washer 31 serves as an internal boundary of the oil system.

By selecting a special lubricating oil (namely, that kind which is known as "extreme pressure" oil) it is assured that there will be maintained between the inter-engaging clutch elements 16 an oil film which will minimise wear when the clutch elements are over-riding during the slipping action. Thus, the oil serves not only as a lubricant but as a shock-absorber between the clutch components 14, 15.

Only a predetermined quantity of oil, less than the capacity of the system, is used so that the oil cannot hinder the adjustment of the compression spring but nevertheless, by compressing the air left in the oil reservoir, the oil presents a resistance to sudden displacement when the clutch elements are over-riding.

As regards the supply of oil, the following will be obvious. The operator unscrews and withdraws the pressure-adjusting nut 20, thus detaching the driven clutch component 15 from the driving clutch component 14 and exposing the interior of the cylinder liner 27. For this operation it is advantageous to grip the end of shank 4 in a vice with the opposite end of the attachment vertically uppermost. The requisite quantity of oil is poured into the liner's cylindrical interior, which is bottomed by the clutch component 14. The other component 15 is thereafter re-inserted in its working position, and the nut 20 is re-screwed to the desired position of adjustment, thus totally enclosing the oil.

The tap-gripping chuck 32 includes a body which at one end has a faucet 32A adapted to make joint with the spigot 15A provided for it on the driven clutch component 15, the spigot and faucet being locked together by a cotter pin 33. The chuck is fitted with two contrivances, one of them adapted to grip the square tap-end T1 and drive the tap T and the other being adapted to grip and centre the circular tap-shank T2. The first of these contrivances is a unit consisting of two flat-faced jaws 34 and an adjustment screw 35, which has a left-hand thread 35A and a right-handed thread 35B engaging the respective jaws. The arrangement is such that the jaws can be adjusted to grip the tap end. The unit 34, 35 is freely slidable diametrally of the chuck 32. The second contrivance consists of four equi-angularly spaced wedge devices 36, each having a gripping face 36A and an inclined adjustment face 36B. These devices fit into radial slots 37 in the body of the chuck and their inclined faces engage complemental inclined faces 37B formed in the chuck. An adjustment nut 38 screwed upon the end of the chuck body engages the wedge devices 36. By appropriate adjustment of the nut 38, the operator can bring the devices into engagement with the shank. Thus it will be seen that the first contrivances 34, 35 grips the tap end T1 and centres itself freely whereas the second contrivance 36, 37, 38 centres the tap precisely. A chuck such as described is adjustable to accommodate a wide range of tap sizes; for instance, an individual chuck may be suitable for taps of the range three-eighths inch to one and a quarter inches.

In the foregoing example, the assembly of attachments has been described mainly in relation to the holding and driving of taps. As previously stated, the assembly is also suitable for driving other tools. For instance, the chuck 32 which has been described can be used as a holder for small drills of say one-half inch diameter or less. Moreover, a die holder may be fitted to the adaptor 7 in substitution for the tap-gripping chuck, such a die holder including a body with a faucet suited to the spigot 15A of the adaptor. Obviously, other kinds of tool holders may be attached to the adaptor instead.

Moreover, in the foregoing example, the attachment has been described as applied to a rotary-spindle machine. The invention is equally applicable to machines, such as turret or other lathes, in which the tool is held stationary and the work is rotated, in which event the attachment or each attachment instead of transmitting the rotary drive takes the reaction of the tool to the work.

I claim:

1. A machine attachment for tools, said attachment being of the slipping-clutch type and comprising a casing, a supporting shaft axially located in said casing and in driving engagement therewith, slipping-clutch components which are a sliding fit in said casing and are movable relatively thereto and to one another, axially spaced oil seals between said casing and the respective components, and an oil reservoir located within the interior of said components, said reservoir comprising a chamber walled by said components, a blind oil-containing hole in one of said components, said shaft fitting into said hole, and an oil passage extending along said shaft to connect said hole with said chamber, said reservoir serving to supply oil between said components and also between them and said casing.

2. A machine attachment for tools and of the slipping clutch type comprising a casing, an adjusting nut screw-threaded on said casing, a pair of driving and driven slipping-clutch components fitted internally within said casing so that circular surfaces on the clutch components engage a bearing surface in the casing, inter-engaging elements on both of said components, the elements on each component being shaped to drive and to slip relative to the elements on the other component, a resilient contrivance interposed between the driving component and the casing and pressing the driving component to engage the driven component, the driving component being axially slidable but held against rotation relative to the casing and the driven component being rotatable and axially slidable relative to the casing but bearing axially against said adjustment nut serving as an abutment on the casing, a lubricating system including a reservoir for lubricating oil provided in the interior of the casing, said reservoir comprising a chamber which is bounded by internal walls formed in said clutch components and which opens to and between the inter-engaging elements so that oil from said reservoir seeps between said elements and passes to said bearing surface and a blind hole with a cylindrical wall inside the driven clutch component, said driven component being maintained by said adjusting nut as a removable closure to said reservoir, a drive-transmitting shaft axially located in the casing and in driving engagement with both the casing and said driving component, said shaft being a sliding and turning fit in said hole, an oil passage provided between said shaft and said wall to connect the hole with said chamber, and oil seals between each of said circular surfaces and said bearing surface to close said system.

3. A machine attachment for tools, said attachment being of the slipping-clutch type and comprising a casing, a supporting shaft axially located in said casing and in driving engagement therewith, slipping-clutch components which are a sliding fit in said casing and are movable relatively thereto and to one another, and an oil reservoir located within the interior of said components, said reservoir comprising a chamber walled by said components, a blind oil-containing hole defined by a cylindrical surface in one of said components, said shaft fitting into said hole, and an oil passage extending between said shaft and said cylindrical surface to connect said hole with said chamber, said reservoir serving to supply oil between said components and also between them and said casing.

4. A slipping clutch attachment for machine tools and comprising a casing, driving and driven components inside said casing, cylindrical surfaces of the same dimetral size on said components, both of which are a working fit inside a continuous cylindrical bearing surface in the casing to maintain said components co-axial and both of which have inter-engaging clutch elements, a resilient contrivance interposed between the casing and one of said components and pressing this component to engage the other component, both components being axially movable relative to each other and to the casing, a lubricating system including an oil reservoir formed by a chamber in the interior of the components for supplying oil to the inter-engaging elements and to said surfaces, said reservoir including a blind hole with a cylindrical wall inside said driven component, a drive-transmitting shaft axially located in the casing and in driving engagement with both the casing and said driving component, said shaft being a sliding and turning fit in said hole, an oil passage provided between said shaft and said wall to connect the hole with said chamber, and means resisting displacement of said driven component along said shaft but maintaining it as a readily removable closure to said reservoir.

References Cited in the file of this patent

UNITED STATES PATENTS

| | | |
|---|---|---|
| 1,789,559 | Meunier | Jan. 20, 1931 |
| 1,991,623 | Onsrud | Feb. 19, 1935 |
| 2,446,363 | Daum | Aug. 3, 1948 |
| 2,466,372 | Byrd | Apr. 5, 1949 |
| 2,540,513 | Dodd | Feb. 6, 1951 |
| 2,547,518 | Benjamin et al. | Apr. 3, 1951 |

FOREIGN PATENTS

| | | |
|---|---|---|
| 451,699 | Germany | Oct. 24, 1927 |
| 418,543 | Great Britain | 1934 |
| 654,203 | Great Britain | June 13, 1951 |